Jan. 15, 1924.

B. F. STAUBER 1,481,036

VEHICLE WHEEL RIM

Filed Nov. 20, 1922

Inventor
Benjamin F. Stauber
By L. L. Westfall
his Attorney

Patented Jan. 15, 1924.

1,481,036

UNITED STATES PATENT OFFICE.

BENJAMIN F. STAUBER, OF SPOKANE, WASHINGTON.

VEHICLE WHEEL RIM.

Application filed November 20, 1922. Serial No. 601,986.

*To all whom it may concern:*

Be it known that I, BENJAMIN F. STAUBER, a citizen of the United States of America, residing at Spokane, Spokane County, State of Washington, have invented new and useful Improvements in Vehicle Wheel Rims, of which the following is a specification.

This invention pertains to demountable rims for automobile tires and has for its object to provide an improved separable rim in order to facilitate the removal and replacing of tires.

The rim is so constructed that the same may be used to carry an inflated tire in reserve.

Figure 1:
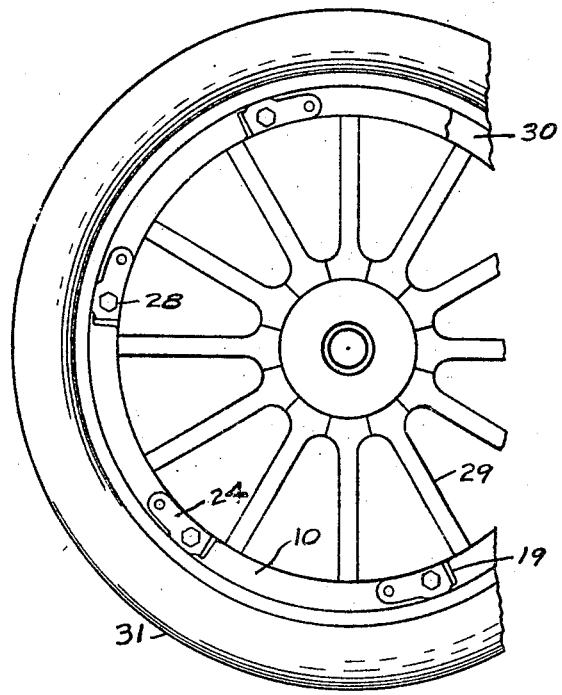
Figure 2:
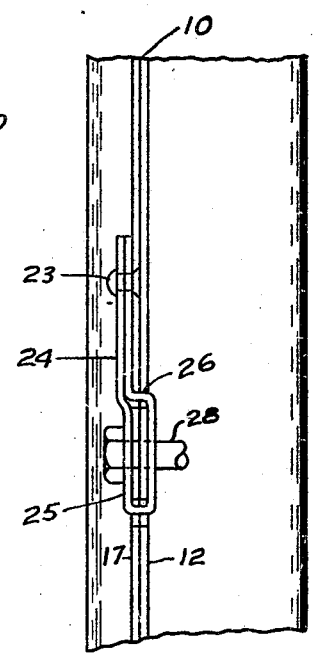
Figure 3:
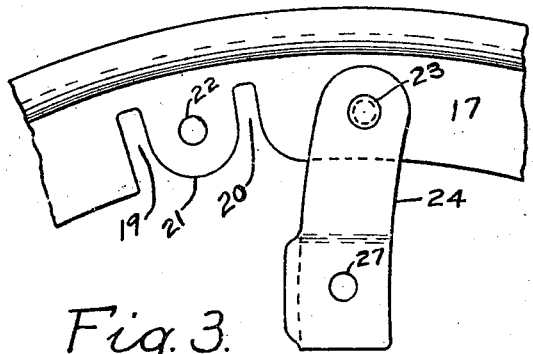
Figure 4:
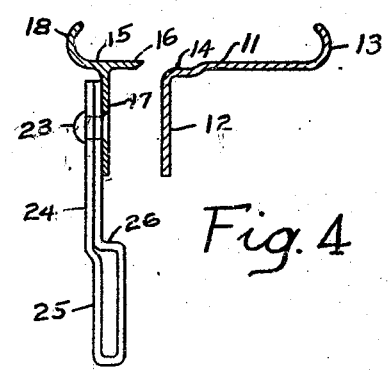

The invention will be hereinafter particularly described and illustrated in the accompanying drawings in which Figure 1 is a broken-away side elevation of an automobile wheel including an inflated tire and my improved demountable rim, Figure 2 is a broken-away inside view of the improved demountable rim, illustrating the manner of securing the separable parts together, Figure 3 is a broken-away side view of the improved rim, further illustrating the manner of securing together the separable parts and Figure 4 is a transverse sectional view of the improved rim, with the two parts separated and with a portion of the interlocking mechanism attached.

In a detail description, in which like numerals refer to like parts throughout the several views, the improved rim comprises an annular member 11 having a right angular annular flange 12 and an annular curved lip 13. An annular depression 14 is provided in the member 11 at its juncture with the flange 12. Co-operating with the member 11 is an annular member 15 having an annular projection 16 adapted for engagement with the depression 14 in the member 11. An annular flange 17 projects inwardly from the member 15 and a curved lip 18 is added to the member 15, corresponding to the curved lip 13 of the member 11. The flanges 12 and 17 are curved out as at 19 and 20, at spaced distances forming lugs 21, the same having openings 22 therethrough. Pivotally attached to the outside of the flange 17 adjacent each of the lugs 21 as by studs 23 is an arm 24 carrying at its outer end, a latch 25 adapted for engaging the lugs 21 on the flanges 17 as shown in Figure 2, whereby the members 11 and 15 are held in rigid relation to each other. It will be observed that there is an offset 26 at the juncture of the arm 24 and latch 25 whereby the latch is positioned to engage the lug 21. The latch 25 has a centrally disposed opening 27 therethrough so that when the latch engages the lug 21, the openings 27 and 22 will correspond and through which the bolts 28 pass when the improved rim is attached to the wheel 29, such bolts passing through the felly 30.

The depression 14 aids in giving a tight and rigid fit of the rim 10 to the felly 30, when the rim is secured in place on the wheel 29. The tire 31, when in place on the rim 10 bears against the members 11 and 15 and against the inner side of the lips 13 and 18. An inflated reserve tire may be carried on one of the rims and in such case it is desirable that bolts be passed through the openings 27 and 22 in the latches and keepers 25 and 21 respectively in order that all of the parts of the rim may be held in rigid relation with each other.

What is claimed is:

1. A demountable rim comprising two annular members adapted to be joined together, each member having an inwardly projecting annular flange, corresponding lugs formed at spaced distances in said flanges, and pivotally mounted latches connected with one of said flanges adapted for engagement with said lugs to hold said flanges in rigid relation with each other, said latches and lugs being provided with corresponding tubular openings, and bolts extending through such openings and adapted for connection with the felly of the wheel.

2. A demountable rim comprising two annular members adapted to be joined together, each member having an inwardly projecting annular flange, corresponding lugs formed at spaced distances in said flanges, pivotally mounted latches connected with one of said flanges, adapted for engagement with said lugs to hold said flanges in rigid relation with each other and an inwardly projecting annular depression on one of said annular members for engagement with the periphery of the felly of the vehicle wheel for aiding in securing a rigid fit of the rim with the wheel.

In testimony whereof, I have affixed my signature,

BENJAMIN F. STAUBER.